United States Patent
Ahlers et al.

(10) Patent No.: US 11,850,454 B2
(45) Date of Patent: Dec. 26, 2023

(54) FIRE PROTECTION ELEMENT

(71) Applicant: Hilti Aktiengesellschaft, Schaan (LI)

(72) Inventors: Andreas Ahlers, Westendorf (DE);
Sebastian Simon, Buchloe Lindenberg (DE)

(73) Assignee: Hilti Aktiengesellschaft, Schaan (LI)

( * ) Notice: Subject to any disclaimer, the term of this patent is extended or adjusted under 35 U.S.C. 154(b) by 409 days.

(21) Appl. No.: 17/296,611

(22) PCT Filed: Nov. 25, 2019

(86) PCT No.: PCT/EP2019/082349
§ 371 (c)(1),
(2) Date: May 25, 2021

(87) PCT Pub. No.: WO2020/120110
PCT Pub. Date: Jun. 18, 2020

(65) Prior Publication Data
US 2022/0001221 A1  Jan. 6, 2022

(30) Foreign Application Priority Data
Dec. 10, 2018  (EP) .................................. 18211205

(51) Int. Cl.
*E04F 17/02* (2006.01)
*A62C 2/06* (2006.01)
*A62C 2/24* (2006.01)
*F16L 5/04* (2006.01)

(52) U.S. Cl.
CPC ................ *A62C 2/065* (2013.01); *A62C 2/24* (2013.01); *F16L 5/04* (2013.01)

(58) Field of Classification Search
CPC ........... A62C 2/065; A62C 2/24; A62C 2/242; A62C 2/248; A62C 3/16; F16L 5/04; E04B 2/7411
See application file for complete search history.

(56) References Cited

U.S. PATENT DOCUMENTS

| | | | |
|---|---|---|---|
| 8,739,482 B1 * | 6/2014 | Feil, III | A62C 2/065 52/220.8 |
| 2003/0101668 A1 * | 6/2003 | Monden | F16L 5/04 52/220.8 |
| 2003/0192269 A1 * | 10/2003 | Radke | H02G 3/0412 52/220.8 |

(Continued)

FOREIGN PATENT DOCUMENTS

GB     2 077 382     12/1981

OTHER PUBLICATIONS

International Search Report dated Dec. 19, 2019 in PCT/EP2019/082349 with English translation, 7 pages.

(Continued)

*Primary Examiner* — Patrick J Maestri
(74) *Attorney, Agent, or Firm* — Grüneberg and Myers PLLC

(57) ABSTRACT

A fire protection element for sealing a combustible body, which penetrates an opening in a wall or ceiling, in the event of a fire, contains a fire protection insert and a movement device which acts on the fire protection insert, the fire protection insert being arranged so as to be movable in the longitudinal direction of the opening.

14 Claims, 2 Drawing Sheets

(56) References Cited

U.S. PATENT DOCUMENTS

| | | | |
|---|---|---|---|
| 2007/0193141 A1* | 8/2007 | Warmolts | F16L 5/025 52/220.8 |
| 2011/0272890 A1* | 11/2011 | Selby | F16L 5/04 277/345 |
| 2012/0233943 A1* | 9/2012 | Monden | F16L 5/04 52/220.1 |
| 2013/0095275 A1* | 4/2013 | Munzenberger | F16L 5/04 156/60 |
| 2014/0007373 A1* | 1/2014 | Muenzenberger | H02G 3/0412 16/2.2 |
| 2016/0146411 A1 | 5/2016 | Luo et al. | |
| 2019/0353371 A1* | 11/2019 | Holyoake | A62C 2/12 |
| 2020/0080666 A1* | 3/2020 | Rakic | E04B 1/947 |
| 2020/0165815 A1* | 5/2020 | Stahl, Jr. | H02G 3/22 |

OTHER PUBLICATIONS

Written Opinion dated Dec. 19, 2019 in PCT/EP2019/082349 with English translation, 10pages.

* cited by examiner

FIRE PROTECTION ELEMENT

CROSS-REFERENCE TO RELATED APPLICATIONS

This application is the National Stage entry under § 371 of International Application No. PCT/EP2019/082349, filed on Nov. 25, 2019, and which claims the benefit of European Application No, 18211205.2, filed on Dec. 10, 2018. The content of each of these applications is hereby incorporated by reference in its entirety.

BACKGROUND OF THE INVENTION

Field of the Invention

The invention relates to a fire protection element for sealing a combustible body, which penetrates an opening in a wall or ceiling, in the event of a fire.

Description of Related Art

In order to prevent the spread of fire or smoke in buildings, openings in ceilings or walls, in which, for example, pipes or cables are routed, must be able to be closed in the event of a fire. Various fire protection solutions are used for this purpose, for example bandages or wraps that are mounted in the wall or as collars in front of the wall.

In this case, various fire protection means are used, for example in the form of inserts which are, for example, fastened to a housing. In particular, intumescent materials are suitable for the inserts. In the event of a fire, the intumescent material foams up under the effect of heat and closes the opening, which prevents or at least delays the spread of smoke or fire.

Fire protection collars have the advantage that they can be mounted outside of the wall and thus can be heated more rapidly in the event of a fire, since the fire protection means is not passively cooled by the surrounding wall.

However, since the collars must be mounted on the outside of the wall, the fire protection can only be mounted after the wall or ceiling, for example made of concrete, has already been cast and pipes or cable guides have been laid. As a result, additional steps are necessary. At the same time, there is no fire protection until the collars are mounted.

A fire protection wrap is known from WO 2016 202 681 A1 which comprises an intumescent material on a carrier. The carrier is made of a material which automatically coils up into a spiral when no opposing force acts on the material. The fire protection wrap is, for example, clamped around a pipe in a wall and is thus kept under pretension. In the event of a fire, the pipe melts away, causing the fire protection wrap to curl up and thereby introduce the intumescent material into the interior of the opening within the wall.

WO 2004 015 319 A1 discloses a collar in which a tensioned helical spring and a heat-resistant woven fabric are provided in an annular housing. In the event of a fire, the helical spring compresses the melting pipe and thereby pulls the heat-resistant woven fabric into the interior of the pipe opening. In addition, an intumescent material is provided which is arranged around the pipe, between a wall and the helical spring, and ensures further closure of the opening.

In DE 10 2004 014 347 B4, lamellar locking elements made of bimetal are used, which are coiled around the pipe and, in the event of a fire, uncoil in order to thereby close the opening in an iris-like manner.

Pipe feedthroughs are known from U.S. Pat. No. 2,017, 009 470 A1, which can be flexibly adapted to the thickness of a wall or ceiling and can already be mounted during the casting of the wall or ceiling. However, said pipe feedthroughs have no fire protection function.

SUMMARY OF THE INVENTION

The object of the invention is to provide a fire protection solution which can already be mounted during the production of a wall or ceiling.

The object is achieved according to the invention by means of a fire protection element for sealing a combustible body, which penetrates an opening in a wall or ceiling, in the event of a fire, comprising a fire protection insert and a movement device which acts on the fire protection insert, the fire protection insert being arranged so as to be movable in the longitudinal direction of the opening.

DETAILED DESCRIPTION OF THE INVENTION

Figure 3:
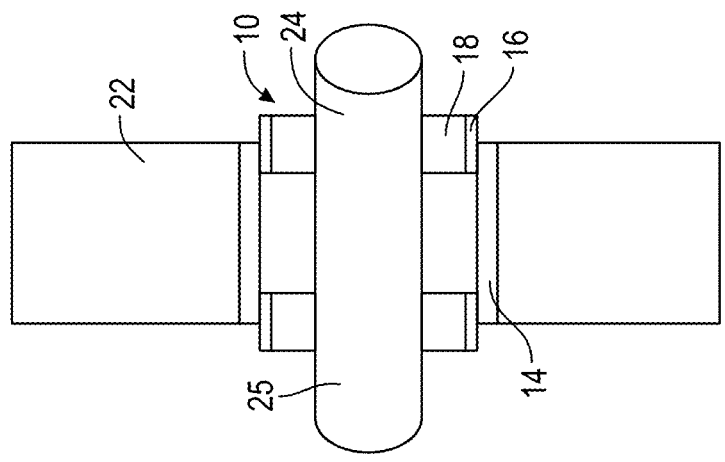
FIG. 3 shows the fire protection element from FIG. 2 after it has been moved out of the wall.

The movable arrangement of the fire protection insert allows the fire protection insert to be already mounted before the wall or ceiling has been cast and the position of the fire protection insert can still be changed during a later step.

The fire protection element can thus, for example, already be applied as a cast-in to the formwork in order to cast a concrete wall or ceiling. Immediately after the wall or ceiling has been cast, the fire protection element is already operatively arranged in the wall or ceiling such that fire protection is ensured as early as possible.

In a starting position of the fire protection element, the fire protection insert is located accordingly within the wall and ceiling and is subsequently transferred, by means of the movement device, into an end position in which the fire protection insert is at least partially outside of the wall or ceiling. The fire protection insert can be coupled to the movement device, such that the fire protection insert can be moved together with the movement device from the starting position into the end position.

The fire protection element can comprise a cladding pipe, in which the movement device and the fire protection insert are arranged. This eliminates the additional step of core drilling in an already completely cast wall or ceiling, since the cladding pipe of the fire protection element provides a feedthrough for a combustible body, for example a pipeline or a cable conduit.

In order to allow spatial separation of the movement device and the fire protection insert from the combustible body which penetrates the fire protection element, the cladding pipe can also have, at at least one axial end, a receiving space in which the movement device and/or the fire protection insert are received.

In a preferred embodiment, the movement device comprises a spring which triggers the movement of the fire protection insert. A spring is a particularly cost-effective form of the movement device.

In a further preferred embodiment, the movement device can have a thread, by means of which the position of the fire protection insert is controlled. This allows, after the wall or ceiling has been cast and the formwork has been dismantled, the fire protection element to be rotated out of the wall, for example by hand or using a screwdriver. At the same time, the thread allows a secure mechanical connection between the movement device and surrounding components which have a mating thread.

In yet a further embodiment, the movement device can comprise a motor, by means of which the position of the fire protection insert is controlled. In this way, the fire protection insert does not have to be moved out of the wall or ceiling by hand.

It is advantageous if the movement device comprises a retaining apparatus, by means of which the fire protection insert can be fixed in its starting position within the opening. The retaining apparatus can, for example, comprise a latching connection. It is possible thereby for the fire protection insert to initially remain within the wall or ceiling even after the formwork has been dismantled, and to be moved out of the wall or ceiling into the end position, such that the fire protection insert at least partially protrudes from the opening, only after the retaining apparatus is released, for example by pushing latching lugs to one side or taking down said lugs.

The retaining apparatus can also be designed such that it fixes the fire protection insert in its end position. The fire protection insert can thereby be prevented from accidentally moving back into the opening. For example, a latching connection and/or catches can be provided as a retaining apparatus in order to secure the fire protection insert in the end position. Fixing the fire protection insert in the starting position and the end position can be achieved using different components with a differing retaining force.

The fire protection insert can have a fire protection material selected from the group consisting of intumescent materials, in particular expandable graphite, fire protection coatings, fire protection foams, in particular based on polyurethane, and ablative coatings, in particular aluminum trihydrate, and combinations thereof. The most suitable fire protection material for a particular application can be selected accordingly. The fire protection element can therefore be used for a plurality of applications.

Furthermore, the object is achieved according to the invention by means of a method for mounting a fire protection element of the type described above in a wall or ceiling, comprising the following steps, it being possible to carry out steps d) and e) in any order: a) introducing the fire protection element into a formwork for casting a wall or ceiling; b) casting the wall or ceiling using concrete; c) dismantling the formwork; d) introducing a combustible body through an opening of the fire protection element; and e) moving the fire protection insert of the fire protection element out of the wall or ceiling by means of the movement device, such that the fire protection insert at least partially protrudes from the wall or ceiling and encompasses the combustible body.

In this way, the fire protection element is already brought to the desired position before concreting the wall or ceiling and is ready for use immediately after the wall or ceiling has been cast.

At the same time, the fire protection element can have an opening which is matched to the combustible body to be later passed through the wall or ceiling. As a result, subsequent core drilling is unnecessary.

According to a preferred embodiment, the fire protection insert is extended into the opening immediately upon insertion of the combustible body, for example by releasing latching elements, such that no additional step is necessary for moving the fire protection element out of the wall or ceiling.

When using the fire protection element according to the invention in a wall, said element is advantageously moved out on both sides of the wall. Fire protection can thereby be ensured, regardless of on which side of the wall a fire occurs.

Preferably, after the wall or ceiling has been cast, the fire protection insert ends flush therewith and is moved into its in-use position in front of the wall or ceiling after the wall or ceiling has been cast. It can thus be ensured that the wall or ceiling can be cast both lying down and standing up. It is also thereby possible for the fire protection element to be installed in prefabricated walls.

Figure 2:
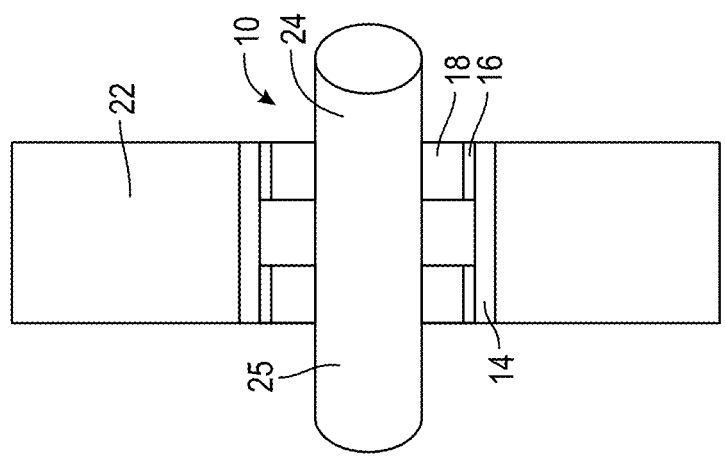
FIG. 2 shows the fire protection element from FIG. 1 within a wall.
Figure 1:
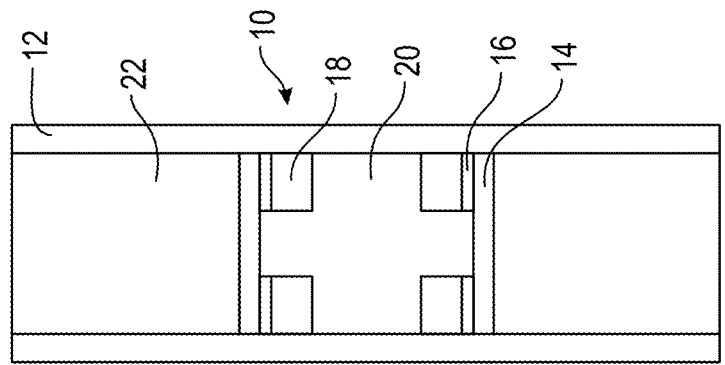
FIG. 1 shows a fire protection element according to the invention within a wall that has a formwork.
Figure 4:
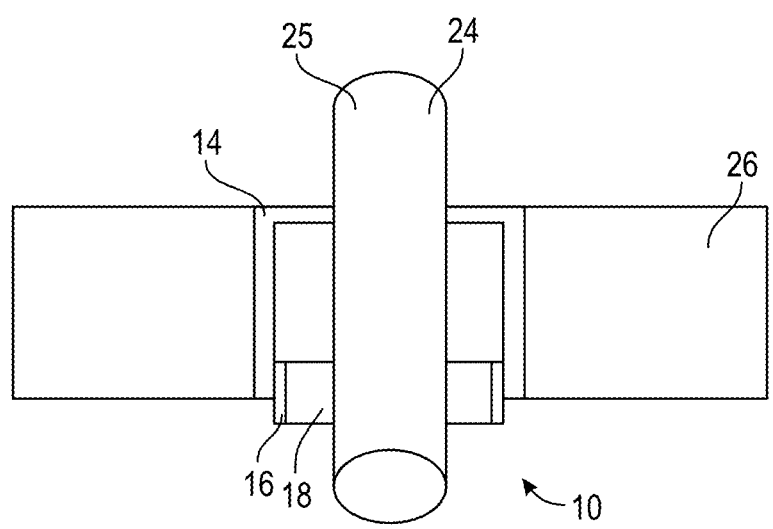
FIG. 4 shows an alternative embodiment of the fire protection element in a ceiling.

Further advantages and features of the invention will become apparent from the following description of preferred embodiments and the drawings to which reference is made. These should not be understood in a limiting sense. In the drawings:

FIG. 1 shows a fire protection element according to the invention within a wall that has a formwork;

FIG. 2 shows the fire protection element from FIG. 1 within a wall;

FIG. 3 shows the fire protection element from FIG. 2 after it has been moved out of the wall; and FIG. 4 shows an alternative embodiment of the fire protection element in a ceiling.

FIG. 1 shows a fire protection element 10 according to the invention, which is fastened within a formwork 12. The fire protection element 10 comprises a cladding pipe 14, a movement device 16 and a fire protection insert 18. In addition, the fire protection element 10 has a continuous opening 20 in the cladding pipe 14. The fire protection insert 18 is arranged so as to be movable in the longitudinal direction of the opening 20 in the cladding pipe 14.

The movement device 16 can be coupled to the fire protection insert 18 such that the fire protection insert 18 can be moved together with the movement device 16 from a starting position in which the fire protection insert 18 is located within the opening 20 into an end position in which the fire protection insert 18 is located at least partially outside of the opening 20.

At the same time, FIG. 1 shows a freshly cast concrete wall 22, of which the size and shape is predetermined by the formwork 12. An opening is created within the wall through the cladding pipe 14 of the fire protection element 10 and through the opening 20 of the fire protection element 10 at the same time.

The wall 22 can, as shown in FIG. 1, be cast vertically in a vertical formwork 12, but can in principle be cast lying in a horizontally oriented formwork 12 as well. The fire protection element 10 ends flush with the wall 22.

FIG. 2 illustrates the wall 22 shown in FIG. 1, in which wall the fire protection element 10 has been cast. In addition, a combustible body 24, in this case a pipe 25, has been passed through the opening 20 of the fire protection element 10. The fire protection element 10 ends flush with the wall 22 as before.

In a next step, the fire protection insert 18 can be moved out of the wall 22 by means of the movement device 16 so that at least part of the fire protection insert 18 lies in a collar-like manner in front of the wall 22, as shown in FIG. 3, and encompasses the combustible body 24.

In this case, the movement device 16, for example, can have a thread which engages in a matching mating thread, for example on the cladding pipe 14, thus allowing the movement device 16 to rotate out of the wall 22, for example by hand or by means of a suitable screwing tool. Instead of the thread, one or more guiding grooves can also be provided in which corresponding guiding pins or ribs engage. As a result, the fire protection insert 18 is also at least partially moved in front of the wall 22 together with the movement device 16.

FIG. 4 shows an alternative embodiment in which a fire protection element 10 has been cast in a ceiling 26. In this embodiment, a fire protection insert 18 and a movement device 16 are provided only on the downward-facing side of the ceiling 26. On the upper side of the ceiling 26, the cladding pipe 14 ends flush with the ceiling 26. The opening 20 of the fire protection element 10 is therefore predetermined on the lower side of the ceiling 26 by the fire protection insert 18 and on the top of the ceiling 26 by the cladding pipe 14.

In the shown embodiments, the fire protection insert 18 is directly connected to the movement device 16. According to a further embodiment, at one or at both axial ends of the fire protection element 10, a receiving space (not shown) can be provided in which the movement device 16 and/or the fire protection insert 18 are received. In this way, the movement device 16 and the fire protection insert 18 can be separate from one another. For example, the movement device 16 can comprise a spring element which acts on the fire protection insert 18 and moves said insert into the end position in front of the wall or ceiling as soon as a counterforce exerted by the formwork 12 or a retaining apparatus is eliminated.

The illustrated fire protection insert 18 can comprise, for example, expandable graphite or another intumescent material as the fire protection material 28. In this case, the expanding intumescent material closes the opening 20 in the event of a fire as soon as the combustible body 24, here the pipe 25, melts.

The invention claimed is:

1. A fire protection element for sealing a combustible body, which penetrates an opening in a wall or ceiling, in the event of a fire, the fire protection element comprising:
   a fire protection insert, and
   a movement device which acts on the fire protection insert,
   wherein the fire protection insert is arranged so as to be movable in the longitudinal direction of the opening,
   wherein the movement device comprises a thread by which the position of the fire protection insert is controlled.

2. The fire protection element according to claim 1, wherein the fire protection insert is located in a starting position within the opening and, by the movement device, can be moved into an end position in which the fire protection insert is located at least partially outside of the opening.

3. The fire protection element according to claim 1, wherein the fire protection insert is coupled to the movement device.

4. The fire protection element according to claim 1, wherein the tire protection element comprises a cladding pipe in which the movement device and/or the fire protection insert are arranged.

5. The fire protection element according to claim 4, wherein the cladding pipe has, on at least one axial end, a receiving space in which the movement device and/or the fire protection insert are arranged.

6. The fire protection element according to claim 1, wherein the movement device comprises a spring which brings about the movement of the fire protection insert.

7. The fire protection element according to claim 1, wherein the movement device comprises a motor by which the movement of the movement device is controlled.

8. The lire protection element according to claim 1, wherein the movement device comprises at least one retaining apparatus that fixes the fire protection insert in position.

9. The lire protection element according to claim 1, wherein the fire protection insert has a fire protection material selected from the group consisting of intumescent materials, fire protection coatings, fire protection foams, ablative coatings, and combinations thereof.

10. A method for mounting a fire protection element according to claim 1 in a wall or ceiling, the method comprising:
    wherein d) and e) can be carried out in any order:
    a) introducing the fire protection element into a formwork for casting a wall or ceiling;
    b) casting the wall or ceiling using concrete;
    c) dismantling the formwork;
    d) introducing a combustible body through the opening of the fire protection element; and
    e) moving the fire protection insert of the fire protection element out of the wall or ceiling by the movement device, such that the fire protection insert is located at least partially outside of the opening.

11. The method according to claim 10, wherein the fire protection insert s moved out of the opening on both sides of the wall or ceiling.

12. The method according to claim 10, wherein the fire protection insert is located within the opening after the wall or ceiling has been cast and ends flush with the wall or ceiling.

13. A fire protection element for sealing a combustible body, which penetrates an opening in a wall or ceiling, in the event of a fire, the fire protection element comprising:
    a fire protection insert, and
    a movement device which acts on the lire protection insert,
    wherein the fire protection insert is arranged so as to be movable in the longitudinal direction of the opening,
    wherein the movement device comprises a motor by which the movement of the movement device is controlled.

14. A method for mounting a fire protection element according to claim 13 in a wall or ceiling, the method comprising:
    wherein d) and e) can be carried out in any order:
    a) introducing the fire protection element into a formwork for casting a wall or ceiling;
    b) casting the wall or ceiling using concrete;
    c) dismantling the formwork;
    d) introducing a combustible body through the opening of the fire protection element; and
    e) moving the tire protection insert of the fire protection element out of the wall or ceiling by the movement device, such that the fire protection insert is located at least partially outside of the opening.

* * * * *